(12) United States Patent
Mezzalira

(10) Patent No.: US 11,586,708 B2
(45) Date of Patent: Feb. 21, 2023

(54) SOFTWARE MAINTENANCE, DISTRIBUTION AND LOADING

(71) Applicant: DAZN LIMITED, Feltham (GB)

(72) Inventor: Luca Mezzalira, Feltham (GB)

(73) Assignee: DAZN LIMITED, Feltham (GB)

( * ) Notice: Subject to any disclaimer, the term of this patent is extended or adjusted under 35 U.S.C. 154(b) by 478 days.

(21) Appl. No.: 16/513,338

(22) Filed: Jul. 16, 2019

(65) Prior Publication Data

US 2020/0034518 A1   Jan. 30, 2020

(30) Foreign Application Priority Data

Jul. 27, 2018  (GB) .................................... 1812287

(51) Int. Cl.
  *G06F 21/12*  (2013.01)
  *G06F 9/4401* (2018.01)
  *G06F 21/44*  (2013.01)

(52) U.S. Cl.
  CPC ............ *G06F 21/12* (2013.01); *G06F 9/4401* (2013.01); *G06F 21/44* (2013.01); *G06F 2221/0704* (2013.01)

(58) Field of Classification Search
  CPC ........ G06F 21/12; G06F 9/4401; G06F 21/44; G06F 2221/0704; G06F 8/36; G06F 8/61; G06F 9/44521; G06F 8/64
  See application file for complete search history.

(56) References Cited

U.S. PATENT DOCUMENTS

| 2003/0135842 | A1* | 7/2003 | Frey ........................ G06F 8/71 717/121 |
| 2008/0040490 | A1* | 2/2008 | Karlberg ................ G06F 8/61 709/228 |
| 2009/0265716 | A1* | 10/2009 | Prashanth ............... G06F 9/54 719/312 |
| 2011/0126179 | A1* | 5/2011 | Hartman ................ G06F 8/656 717/136 |

(Continued)

FOREIGN PATENT DOCUMENTS

| GB | 2311388 A | 9/1997 |
| GB | 2311390 A | 9/1997 |

OTHER PUBLICATIONS

IP Office, "Combined Search Report and Abbreviated Examination Report", App. No. GB1812287.9, dated Mar. 7, 2019, 7 pages.

(Continued)

*Primary Examiner* — Mohammad W Reza
(74) *Attorney, Agent, or Firm* — Dorsey & Whitney LLP

(57) ABSTRACT

A method for content delivery to a user device, that helps to reduce bandwidth requirements and increases security of the content. The method includes receiving a download request from the user device, the download request including request data corresponding to characteristics of the user device, analyzing the request data to select a bootstrap module; transmitting the bootstrap module to the user device for download; analyzing an authentication characteristic to determine that the user device is authenticated for content viewing; transmitting a content catalogue to the user device; and upon receiving a user selection of a content item from the content catalogue, transmitting the user selected content item to the user device.

19 Claims, 13 Drawing Sheets

(56) References Cited

U.S. PATENT DOCUMENTS

| | | | |
|---|---|---|---|
| 2012/0096445 A1* | 4/2012 | Berg | G06F 9/44547 |
| | | | 717/140 |
| 2015/0161385 A1* | 6/2015 | Gounares | G06F 21/577 |
| | | | 726/25 |
| 2017/0212752 A1* | 7/2017 | Ekambaram | G06F 8/77 |
| 2019/0065179 A1* | 2/2019 | Novak | G06F 8/71 |

OTHER PUBLICATIONS

Extended European Search Report for European Patent Application No. 19188311.5 dated Feb. 18, 2020, 9 pages.

\* cited by examiner

300

|  | | Setting 1 | Setting 2 | ... |
|---|---|---|---|---|
| Chapter 1 | | | | |
| | Feature 1 | US | JP | ... |
| | Feature 2 | jOS | jOS | ... |
| | ... | ... | ... | ... |
| Chapter 2 | | | | ... |
| | Feature 1 | US | DE | ... |
| | Feature 2 | jOS | jOS | ... |
| | ... | ... | ... | ... |
| Chapter 3 | | | | |
| | Feature 1 | | JP | ... |
| | Feature 2 | | jOS | ... |
| | ... | ... | ... | ... |
| ... | ... | ... | ... | ... |
| | ... | ... | ... | ... |

`Country_Provider_UserType | SettingN`

Fig. 4

SOFTWARE MAINTENANCE, DISTRIBUTION AND LOADING

CROSS REFERENCE TO RELATED APPLICATIONS

This application claims priority to UK patent application no. 1812287.9 filed on 27 Jul. 2018, entitled "Software Maintenance, Distribution and Loading," which is incorporated by reference herein for all purposes.

TECHNICAL FIELD

The present disclosure relates to the maintenance, distribution and loading of software applications, in particular although not exclusively web applications

BACKGROUND

Software applications may be used in contexts where a software application is provided by a primary service provider on behalf of a number of secondary service providers. An example is an over the top (OTT) video streaming service, such as a sports content service provided by a sports content provider. The primary provider may provide content such as sports on behalf of secondary service providers, for example television, telephone and/or broadband service providers. In this and other situations it is often desirable for the software to behave in a specific way for each secondary service provider, to behave in a specific way based on a country in which the service is to be consumed, based on a subscription a user has, based on the device or type of device on which the software is intended to run and the like. One approach to this is to build a software application that covers all these options and selects a desired behavior based on information, such as a user profile or other locally stored information, when the software is executed. To cover all the possible options, such a software application will be large in size and have significant persistent storage memory requirements.

Web applications are software applications, typically written in JavaScript, that are served to a client device inside a web browser and run in the web browser. A popular approach for implementing a web application is to provide a single page application (SPA) that is loaded in a single browser page request and, once downloaded, runs locally. Since a SPA needs to be fully downloaded before it is run, the large size of an application covering many options as described above is problematic for web applications and in particular SPAs.

In addition to the bandwidth limitations that can occur due to the large size of the OTT streaming software applications for the reasons noted above, many content streaming applications are downloaded onto the user device and allow the user to access content directly from the application. However, this type of accessibility can lead to security issues. In particular, as the entire application is downloaded before a user has been authenticated, tech savvy users can "hack" into the application and access content or playback functionality without paying or otherwise subscribing to the content.

SUMMARY

Aspects of the invention are set out in the independent claims, with optional features of embodiments set out in the remaining, dependent claims.

A computer-implemented method of preparing a software application for download is disclosed. The method comprises receiving source information comprising source code for a software application. The source code comprises a source code portion for each of a plurality of features of the software application. A plurality of settings is received, each setting identifying a subset of the plurality of features. A respective set of (one or more) source code portions is identified for each of the plurality of settings and a respective specific application for each of the plurality of settings is built using the respective sets of source code portions. The specific applications are stored ready for downloading of each specific application in response to a download request identifying the respective setting.

The source code portions may be identified by reading a configuration file that maps settings to corresponding sets of source code portions and using this information to package or compile the identified set for each setting to build the corresponding specific application. In some implementations, in addition or alternatively, the source code may be automatically parsed to identify the sets of source code portions, either providing input to a compiler or generating a configuration file as described above. Parsing may comprise searching the source code for flags or keywords, searching configuration information included with the source information to find configuration information identifying source code for a feature and the like. Building the respective applications may comprise resolving dependencies in, compiling and linking the source code in each set.

Building the specific applications may comprise one or more of compiling, linking, optimizing and the like of the source code. Compiling the source code may comprise compiling to native code for a target machine or transpiling the source code to a different language of similar abstraction level. For example, the source code may be written in JavaScript ES6+ and may be transpiled to JavaScript ES5. In some implementations, building the specific application does not involve compiling or the like but may comprise packaging the source code portions for each set without any compiling or the like to form the specific applications. In these implementations the language of the source code of the software application is the same as the language of the specific applications, for example the same version of JavaScript such as ES6+, and the build process involves selecting the relevant code portions and packaging them for each specific application.

By producing and making available for download a set of specific applications or functionality modules in this way, each specific application will only have the code or logic required for its specific setting or function and will therefore be smaller than an application maintaining all options and deciding on the required ones at run time. Using specific applications built in this way therefore requires less storage and memory to execute the applications at a client or user device and enables the specific application to be downloaded relatively faster than the full software application. By providing an automated build pipeline in the way described above, with building of a set of specific applications triggered by a change in source code of the software application, the software application can be developed and maintained like a conventional (all options) application, for example an SPA, while producing lean specific applications that require less resources to be downloaded and executed. This approach therefore avoids the additional effort of separately developing and maintaining each specific application.

Each source code portion may correspond to a given feature or function (e.g., playback logic) but it will be appreciated that the source code portions may be overlapping, for example source code may be shared between different service providers, countries and languages, as example of features. The term "feature" is used to designate a given characteristic or function, such as country, language or end service provider for the software. A feature can either be present or absent (a certain viewer arrangement or account page for example) or can take one of a plurality of values (language or service provider for example) but in either case the feature absence, presence or value determines code portions to be used. A setting is thus the collection of features and their values, whether the value is binary (for example presence or absence), one of a number of possible values (for example a flag identifying a service provider) or any other numeric value indicative of a feature.

Storing may comprise storing all specific applications in a data center or in a plurality of data centers, for example replicating the applications in geographical locations or storing applications relevant to a specific geographic location in a data center close to or in that location. The request may identify the setting by a look-up code in conjunction with a table identifying a feature setting for each look-up code, by location, device type and/or other information read from a client device. In one specific example, identification may be by way of a user identifier, for example read from a cookie on a client device, the setting for the user being identified in a user profile of the user, for example.

The plurality of features may comprise one or more of: country specific adaptations; device specific adaptations; a language of a user interface provided by the software application; functionality specific to a service provider or intermediary of a service provided using the software application; a payment functionality; a content viewing functionality; a content catalogue functionality; a media player; a social media functionality; a content commenting functionality and an account management functionality. In one example, the specific applications are created for a set of possible combinations of target country and device where the software application is to be run. In another example, the specific applications are created for a set of combinations of end service providers/intermediaries and relevant country (since one service provider/intermediary may have different requirements for different countries) and target device. For the avoidance of doubt, it can be noted that some features may be mutually exclusive (e.g. only one language or service provider for any one specific application) while others can be combined, for example a service provider may operate in different languages, offering different payment functionalities depending on the country of a user and different combinations of content players and catalogues.

The software application may comprise conceptual parts having a specific functionality, such as an account management functionality, a sign in functionality, a media player functionality, a media catalogue functionality, a social media functionality and the like. Such parts are referred to as "chapters" or modules in this disclosure. Each chapter may have one or more corresponding source code portions, which may or may not be overlapping. For example, a chapter for account management may have a corresponding code portion in each language available and, correspondingly, the code portions for each language may be distributed between different chapters.

In some such implementations, the method may comprise identifying a respective set of source code portions for each of the chapters with each of the plurality of settings, so that a resulting number of specific applications is equal to the number of chapters multiplied to the number of settings if all settings are applicable to each of the chapters. Building a respective specific application may comprise building a respective specific application with each of the plurality of settings for each of the chapters using the respective sets of source code portions, so that the number of specific applications equals the number of sets. Storing the specific applications may then comprise storing the specific applications for each chapter for downloading of each specific application in response to a download request identifying the respective setting and chapter.

Advantageously, splitting the software application into chapters that can be built independently and maintaining a repository of such independently built applications allows a client to only load a specific application for a required chapter (e.g., functionality) at a time, thereby reducing the download time at the outset. Additionally, splitting the application up in this way allows it to be developed and maintained in a modular manner, with each chapter capable of being worked on by a respective team. The terms "specific applications" and "chapter" and "module" may be used interchangeably in this disclosure where appropriate in context.

In some other implementations, the software application also may comprise a plurality of chapters, each chapter having a specific functionality, for example as described above. Each chapter also may have one or more corresponding source code portions. The source code for each chapter can be tested substantially independently of the source code of the other chapters and may even be capable of separate compilation, as described above. In such implementations, the method may comprise selecting for each setting a subset of the plurality of chapters required by the setting and identifying the respective set of source code portions within the subset of chapters, to produce a specific application having the required chapters for each setting in one specific application.

In some implementations, the method may comprise collecting statistics on the usage of features and/or requests for missing features during use of a specific application by one or more users and generating a new setting based on the statistics and the current setting of the specific application. The method may then comprise building a new specific application for the new setting; and storing the new specific application for downloading in response to a download request identifying the new setting. The new setting may have a requested missing feature added, for example in response to a single request or a threshold number of request for the missing feature. Alternatively or additionally, the new setting may have an infrequently or unused setting removed. In some implementations, the method may comprise receiving a request for a missing feature from a specific application running at a client device; building a new specific application comprising the features of that specific application and the missing feature, the new specific application corresponding to a new setting, and storing the new specific application for downloading in response to a download request identifying the new setting.

Also disclosed is a computer-implemented method of providing access to a software application from a server to a client device over a communications network. The method comprises receiving a request to download a software application having a plurality of features and serving a bootstrap application, which may function as a framework module or basic module, to the client device in response. The bootstrap application is configured to read information stored on the client device to determine a specific application to be loaded, the specific application having a subset of the features of the software application. Subsequently, a request for a specific application is received from the bootstrap application and the specific application is served to the client device in response to the request from the bootstrap application.

Advantageously by first providing a bootstrap application, which may be lightweight and limited in functionality and configured to determine from local information which specific application is required as described below, the correct specific application can then be served instead of serving the full software application, thereby reducing bandwidth requirement.

The request may comprise information read by the bootstrap application from the client device and the method may comprise processing the information to determine the specific software application corresponding to the request. Alternatively, the processing may happen at the client device and the request may directly identify the specific application or corresponding setting.

In some implementations, the software application may comprise a plurality of chapters, as described above, and the specific application served provides the functionality of one of the chapters. In such implementations, the method may comprise receiving a further request for a further specific application from the bootstrap application, which provides the functionality of a further one of the chapters and serving the further specific application to the client device in response to the further request. The further request may be sent by the bootstrap application managing the loading of specific applications or by a running specific application when the need for the further specific application is encountered. In this way, by loading the software application chapter by chapter, bandwidth requirements may be reduced even further.

Also disclosed is a computer-implemented method of requesting a software application for downloading to a client device over a communications network. The method comprises, using an application received on the client device in response to a request to download the software application, reading local information stored on the client device and sending a request for a specific software application over the communications network. The request is based on the local information and the specific software application has a subset of features of the software application. These steps may be implemented by a bootstrap application as described above. The request may comprise the local information. The local information may comprise user credentials and/or other information. The local information in the request may then be processed at a server to decide on a specific application that is required. Alternatively, this processing may happen locally and the request may comprise an identifier of the setting and hence the specific application that is required to be downloaded.

In some implementations, the software application comprises a plurality of chapters as described above, and the specific application provides the functionality of one of the chapters. In such implementations, the method may comprise receiving a request for a further specific application, for example from a specific application that is currently running, such as by way of a call back, wherein the further specific application provides the functionality of a further one of the chapters and sending a request for the further specific application to a server over the communications network in response to the request.

The request may be received from the specific application or a web browser in which the specific application runs, for example in response to a user input. The method may be carried out by a bootstrap application as described above. The bootstrap application may be running in web browser and the request may be from the specific application via its user interface or from a user entering a URL in the browser, i.e. from the browser.

Further disclosed is a computer-implemented method of accessing a feature of a software application. The method comprises running a first version of the software application having a subset of features of the software application excluding the feature to be accessed and a user interface comprising a user-selectable option for accessing the feature and sending, in response to a user selecting the user-selectable option, a request is sent for a second version of the software application having a set of features of the software application including the feature to be accessed. The method further comprises receiving the second version of the software application and running the second version of the software application in place of the first version to provide access to the feature to be accessed.

In any of the disclosed implementations, the software application may be a web application running in a web browser or similar interface, or a native application interacting directly with the operating system (OS) of the device running it. In either case, the software application may be a media consumption application comprising a video streaming functionality.

The disclosure extends to a computer program product comprising coded instructions that, when executed on a processor implement a method as described above. The disclosure further extends to one or more computer-readable media storing coded instructions that, when executed on a processor, implement a method as described above and to a computer system, for example a client device where appropriate in context, comprising such computer readable media and a processor configured to execute the coded instructions. The disclosure extends also to a computer system or, where appropriate, client device comprising means for doing the method steps set out above.

In one embodiment, a method of transmitting a software program to a user device is disclosed. The method includes receiving a download request from a user device selecting a managing framework module to operate on the user device, which may be based on the download request format or location, transmitting the managing framework module to the user device, where the managing framework module lacks full functionality of the software program, receiving a first request from the user device via the managing framework module to receive a first functionality module, where the first functionality module is generic to the characteristics of the user device, and transmitting the first functionality to the user device.

In another embodiment, a method for content delivery to a user device. The method includes receiving a download request from the user device, identifying a managing framework module for the user device or operating environment on the user device; transmitting the managing framework module to the user device for download; analyzing an authentication characteristic to determine that the user device is authenticated for content viewing; transmitting a content catalogue to the user device; and upon receiving a user selection of a content item from the content catalogue, transmitting a playback module to the user device to enable viewing of selected content item and streaming the content item to the user device.

BRIEF DESCRIPTION OF THE DRAWINGS

Some specific implementations of the invention are now described by way of example and with reference to the accompanying drawings, in which:

FIG. 3 illustrates a data structure defining feature settings;

FIG. 4 illustrates a data structure defining a settings identifier;

DETAILED DESCRIPTION

Figure 1A:
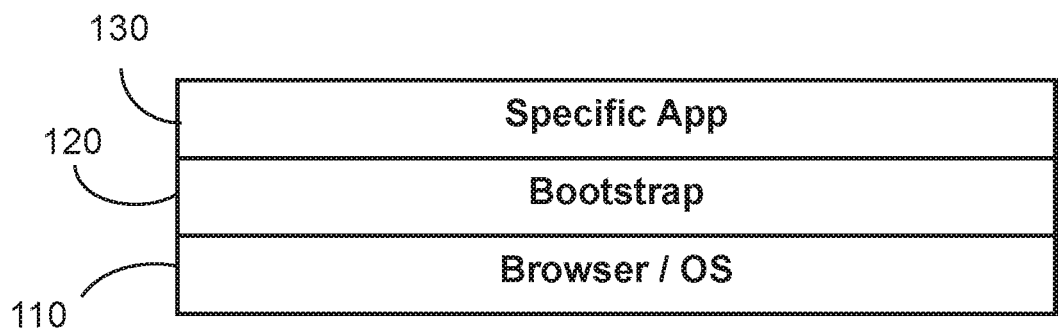
FIG. 1A illustrates a first example of an environment for loading and executing specific applications corresponding to respective feature settings.

In overview, some embodiments of the present disclosure relate to the building, serving, loading and using of software applications, in particular web application such as SPAs, in a way that enables the size of applications to be reduced. The present disclosure is particularly relevant in the case of applications that have many different settings of features of the application, such as one setting per service provider and country in cases where the application is provided in multiple countries by multiple service providers, for example. The disclosed approaches enable a reduction in application size by building specific applications that have the features/ feature values required for each setting and then loading the specific application that is required for a setting that applies to a client device or user account requesting the application.

Additionally, embodiments described herein are related to user and device tailored downloads to access and view content, that help to reduce transmission time and size of the downloaded software modules for viewing the content, while also helping to better secure content, and optionally allow the content to be updated based on changes in the user location or account, i.e., update the accessible content based on the user traveling from one country to another. As one example, an initial host or managing framework application, is downloaded onto the user device, after receiving a download request from the user, e.g., by the user selecting a download option on a webpage or selecting an application for download in an application store ("app. store"), e.g., iTunes or Google Play app stores. The download request is mapped to particular target modules or otherwise may include information used to select a version of the managing framework module or other basic module to download, e.g., device hardware characteristics, platform, or operating environment , which helps ensure that the managing framework module can operate properly on the user device or in the operating environment (e.g., for a web browser versus application on Android TV, vs. Fire TV, etc.).

In some embodiments, the managing framework may determine additional device or user characteristics, such as country, language, operating system, etc. once installed and operating on the user device. In one example, the managing framework module may determine location by pinging a network server and using the response from the server to determine the location, such as by determining the server location. Using these device characteristics, the managing framework may then identify a more target specific chapter or module to download, such as a baseline module, that provides a tailored functionality to the managing framework specific to the user device and location. In this manner, the baseline module may add a layer to the managing framework module to allow the framework module to better tailor requests for additional modules and chapters.

The managing framework module determines whether the user is authenticated or not, such as by validating a token stored on the user device, and once validated, then can retrieve different feature and functionality modules from the server based on user needs. These functionality and feature modules act to populate the overall functionality of the managing framework module and build out the full application to be executed on the user device. As one example, after validation, the managing framework module may retrieve a catalogue module that includes a list of available content items (e.g., streamable media such as sporting events, videos, and the like) that can be viewed or otherwise accessed by the user. The catalogue module is an offered functionality of the entire application, but downloaded onto the user device separately from the initial managing framework module and only when needed by the user, e.g., after authentication. This helps to prevent the initial user download from taking too much time and storage space when downloaded and prevents the catalogue module from being improperly accessed, e.g., by an unauthenticated user, since the module is not provided to the user device until the user is authenticated.

Additionally, in some instances, the catalogue module includes a content list that may be specific to the user account and/or location, e.g., based on a subscription tier, service provider options based on country, and the like. When the user inputs a selection, the managing framework module then retrieves the selected content item module from the server, allowing the user to access or view the content, e.g., by streaming the content or by downloading the content.

Notably, the managing framework module does not include all functionality or feature modules that will be accessible and required to deliver content and other features to an authenticated user. Rather, the managing framework module is used to manage and retrieve selected feature modules at different times and instances, dynamically and as needed, helping to reduce the storage space on the user device required for the managing application and increases download speed. In short, the managing framework module retrieves code on a need basis, such that at any given time, the user device includes sufficient coded modules for the state of the program or present user requests, rather than future requests.

In this manner, the managing framework module helps to increase security of the content playback logic and other type of features, since the playback logic modules are downloaded to the user device only at the time of authenticated login. This increases security for the coded modules as compared to conventional application downloads, where most, if not all, of the required functional logic is downloaded on the user device at the initial download. With the managing framework module and piecemeal downloading of functionality, a user cannot access content or other features via a "backdoor" or other hacking mechanism since the playback and functionality logic is transmitted to the user device only after a user has both been authenticated and requested the content playback. Similarly, this allows the server to help ensure compliance with business partners, country specific requirements, or the like, where certain content is not to be accessible in certain jurisdictions, since the content accessible to the user is dynamically updated, rather than statically retrieved by the managing application from a location on the user device.

Additionally, in some embodiments, the managing framework module includes device specific application programming interfaces (APIs) that interface with the functionality and framework modules. Alternatively or additionally, the interface APIs may be embedded in the baseline or initial module downloaded first by the managing framework module once executing on the user device. The APIs allow the managing framework module (and/or combination of the managing framework module and baseline module) to be device or operating environment specific, but the functionality and framework modules to be device agnostic or otherwise generic, working with any device supported by the platform. This helps to reduce time and engineering that would typically be required to generate device specific function modules and allows the application to run smoother and faster.

Once a user selects a content item to view, the server may stream the content, e.g., send packets of data corresponding to the content in pieces or segments, where the data is discarded by the managing application after it is displayed. This further helps in the management of content and security.

Turning to the figures, the specific features of the present disclosure will now be discussed in more detail. With reference to FIG. 1A, in one implementation a light application referred to herein as a bootstrap 120 or managing framework application is configured to run in a web browser 110 in response to a request from the web browser 110 to access the software application. The bootstrap 120 reads local information from the environment in which the web browser runs, for example identifying a service provider making the service provided by the software application available, a country associated with the provision of the service, a user profile or identifier, an authentication token, and/or the like. The bootstrap 120 uses the local information to load a specific application or baseline application, specifically adapted based on the local information, for example having features and customizations of a service provider, omitting features not available for the country in question, omitting a sign-in page if a valid authentication token is found and so forth. Processes for creating specific applications from the full software application and for requesting and serving the specific applications are described in detail below.

While the specific disclosure is made in terms of the example of a web application running in the web browser 110, it will be appreciated that the disclosure is not so limited and is more widely applicable, for example for other web access interfaces like those provided in smart televisions, set-top boxes, smartphones, tablets, and other computing or content consuming devices. Equally, it will be appreciated that the disclosure is applicable to other execution environments, for example the bootstrap 120 and/or specific application 130 running directly in a native operating environment. The specific disclosure is made in terms of a media access application providing access to media content, for example streaming video, and in particular media content provided with a subscription model. In one specific example, the media content is sports content, such as live or recorded sports matches, for example boxing, soccer, football, basketball, tennis and the like.

Figure 1B:
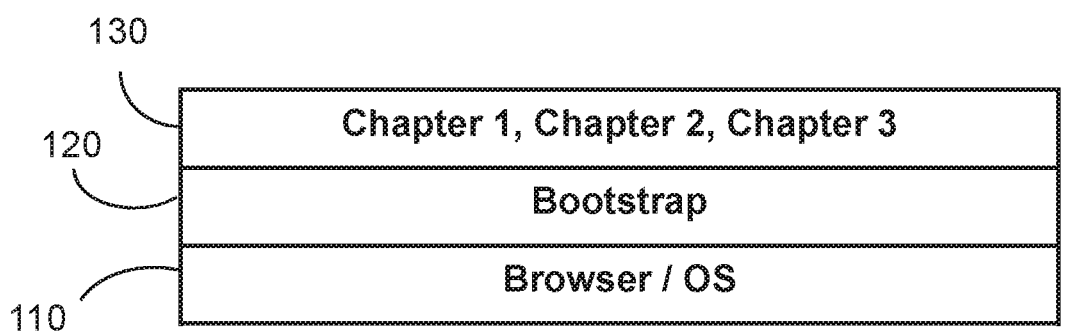
FIG. 1B illustrates a second example of an environment for loading and executing specific applications corresponding to respective feature settings.

With reference to FIG. 1B, in some implementations of the specific application 130, the software application is written in a way so that it has separate portions of source code that can be built separately into separate executables or modules or at least are independently testable, thereby allowing different teams to work on the different portions. These portions are referred to as chapters in this disclosure. Chapters and modules may provide respective functionalities like: sign-in; account generation; account management; content management; content catalogue; content player; content commenting and other social media integration; settings and preferences. In addition to enabling development by several teams, the specific application 130 may be selected to have only the chapters that are required, as determined based on the local information. Accordingly, the footprint of the specific applications 130 can be further reduced by stripping functionality that is not required in terms of chapters from each specific application 130. Again, this is described in more detail below.

Figure 1C:
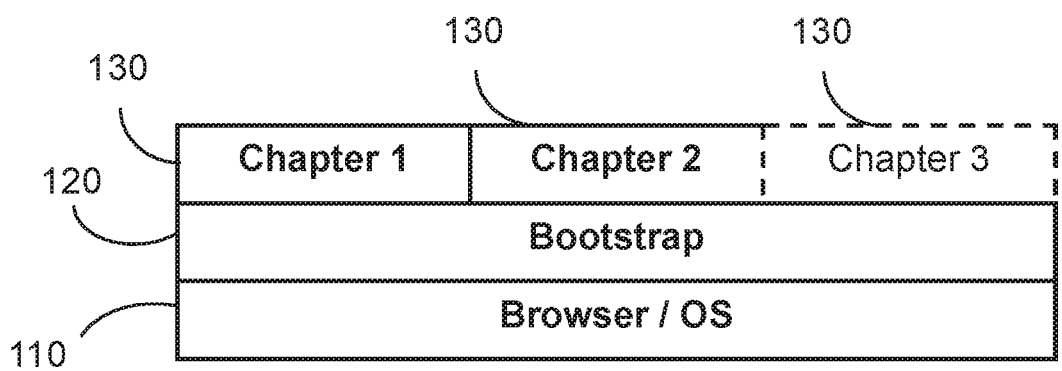
FIG. 1C illustrates a third example for an environment for loading and executing specific applications corresponding to respective feature settings
Figure 2:
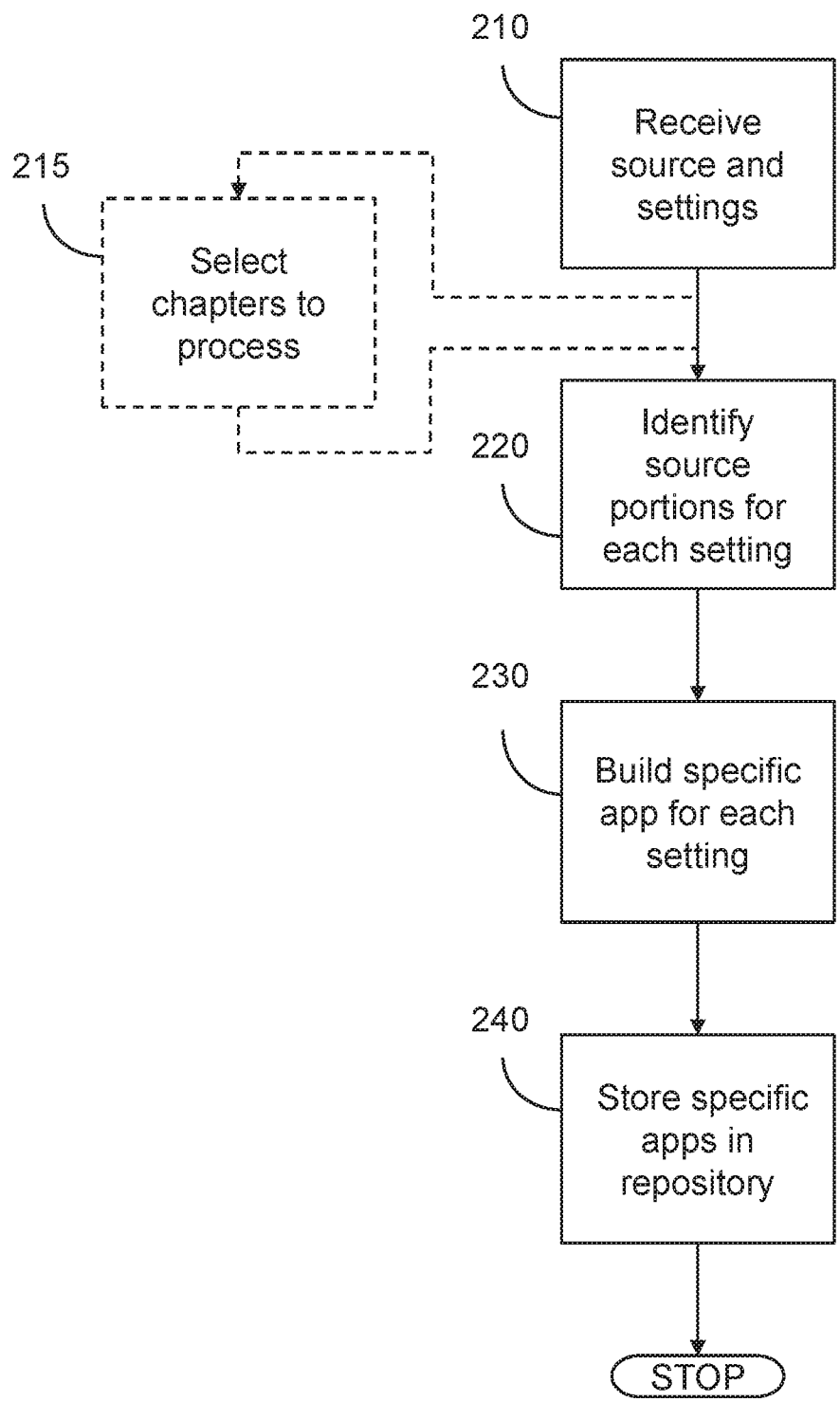
FIG. 2 illustrates processes for maintaining a repository of specific applications.

With reference to FIG. 1C, in further implementations based on splitting the software application into chapters as described above, the footprint of loading the specific application 130 can be further reduced by making each specific application 130 specific to a corresponding chapter, meaning that each chapter is loaded separately as a corresponding specific application, so that chapters are loaded only when they are needed. Since each chapter, in these implementations, corresponds to a specific application 130, the terms are used interchangeably in this context. In the example illustrated in FIG. 1C, chapters 1 and 2 have been loaded already, while chapter 3 is not (yet) required and has not been loaded, as indicated by the broken lines. In these implementations, the role of the bootstrap 120 is, in some implementations, expanded beyond the initial loading of a specific application 130 to coordinate the loading of further specific applications 130 corresponding to subsequent chapters, coordinating call backs from one chapter 130 requesting another one, for instance. The functionality of the bootstrap may further include implementation of deep linking directly to a given chapter by intercepting URL requests entered in the web browser 110, as well as the management of resources common to the specific applications 130, such as a common cache of resources such as fonts, CSS files, libraries such as java script libraries, authentication tokens such as JSON Web Tokens (JWT) and the like.

In summary, the bootstrap 120, which may be implemented as a light application comprising a HTML and a JavaScript file, may have one or more of the following functionalities, as required by the specific implementation:

Loading specific applications/chapters based on local information or call-backs from other chapters
Deep linking directly to chapters
Accessing local information
Reading and verifying tokens such as JWT to detect if a user is authenticated or not and loading a chapter accordingly
Caching resources (javascript libraries, CSS files, fonts . . . )
Consuming the following services:
  Startup
  ResourceStrings
  RefreshToken (this will be called just once from the bootstrap and each chapter that requires authentication will have logic embedded inside itto process the Ref reshToken)

Turning now to FIGS. 2, 3, 4 and 11, a process for creating a set of specific applications for a corresponding set of feature settings provides an application generation automation pipeline 1120 between a source repository 1110 and an application repository 1130. The process comprises a step 210 of receiving source code for the software application including (potentially overlapping) code portions for the required specific applications or chapters corresponding to required feature settings. Receiving the source code and settings may involve a trigger detecting changes in the source repository 1110 or the required feature settings and trigger the remaining steps of the process in response to detecting the change.

Many different combinations of feature settings can be processed with the disclosed process. For example, the software application may be provided as a direct service by the software application developer and as a white-labelled or branded service provided on behalf of other service providers and in each case in different countries. Equally, the target device or environment on which the software application is to be run may also be one factor in the combination of settings giving rise to a set of specific applications/chapters 130 for distribution. However, in some implementations, source code is written separately for each target device in respective repositories 1110 and processed independently, sequentially or in parallel. The resulting specific applications 130 may in turn be stored in the same or separate repositories 1130.

With reference to FIG. 3, a data structure 300 for defining feature settings in some implementations comprises a list of chapters or modules, for example {My Account/Sign In; Content Catalogue; Content Player; Content Commenting; . . . }. For each chapter, a table is provided that defines the features of each chapter, for example {Country; Language; Execution Environment; Functionality Features}. In another example, as illustrated in FIG. 3, a first and a second chapter are available in the US and JP with different, potentially overlapping, functionality and is in each country available on an execution platform "jOS" in two different settings Setting 1 and Setting 2. A third chapter is not available in Setting 1 but is available in Setting 2 in Japan, on the same platform. The data structure 300 associates a specific setting of features presence or absence and feature values with a setting identifier (Setting 1, Setting 2, . . . ). The selection of a feature setting based on local information uses, in some implementation, a separate data structure 400 linking local information (for example a country, a provider, a user type) with a corresponding setting identifier. Local information further may comprise an identifier of the execution platform, such as device type and/or operating system on the device requesting the software application.

Returning to FIG. 2, at an optional step 215, in cases where the software application is structured in chapters or modules as discussed above, the chapters to process are selected. In implementations described above with reference to FIG. 1B, each chapter source code provides its code for the specific application 130 of each feature setting. In implementations in which each chapter is built into a separate specific application 130 as discussed above with reference to FIG. 1C, each chapter is built into a separate specific application 130 for each feature setting, either in sequence or in parallel for each chapter.

At step 220, the automation pipeline 1120 identifies in the original the source code (of the software application or of each chapter) the source code required for each feature setting, for example by accessing a configuration file that identifies the relevant source code portion(s) for each setting or by parsing the original source code. Parsing the original source code and/or configuration files required for building the source code may involve a text search for certain keywords associated with each feature setting, a search for pre-defined flags applied by developers to the code or any other suitable method.

At step 230, the identified source code for each feature setting is built, in some implementations compiled and linked, into corresponding specific applications or chapters 130, as the case may be, using the corresponding portions of configuration information and relevant libraries. In some implementations the source code is transpiled, for example from one version of JavaScript to another version. However, in some implementations, the specific applications are built by packaging the identified source code for each feature setting, that is the specific applications remain in the same language as the original source code, for example JavaScript and more specifically the same version of JavaScript. The built specific applications are then stored in the application repository 1130 for subsequent download on request from a client device as described below. Steps 220 to 240 can be executed sequentially stepping through the feature settings one by one or in parallel. Likewise, the process may run afresh for each detected change or incrementally after an initial built by only re-building or adding specific applications 130 affected by a change in source code, configuration information or feature settings.

Figure 5A:
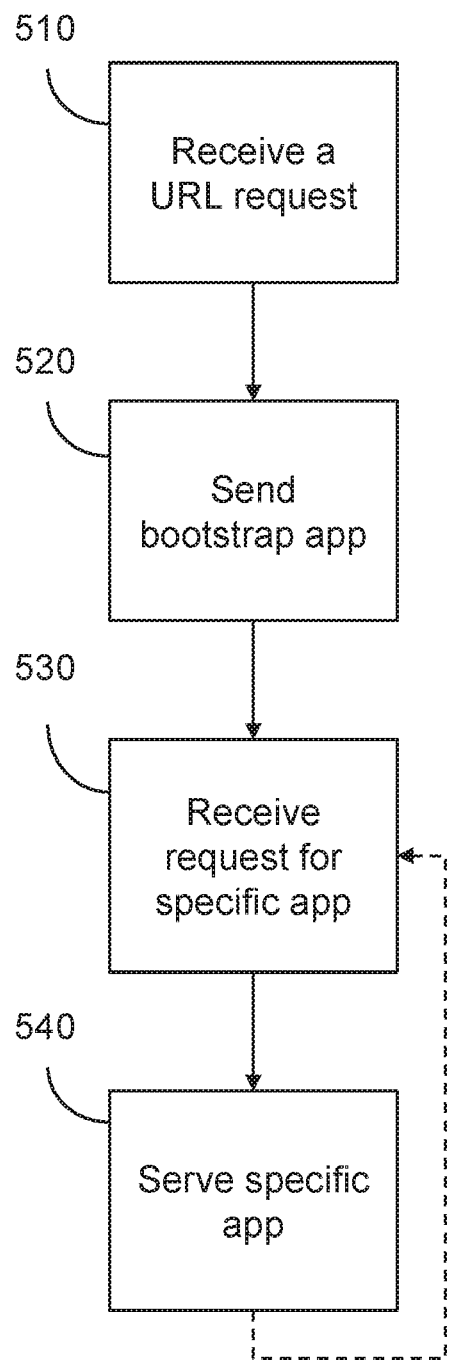
FIG. 5A illustrates a process for serving a specific application.
Figure 12:
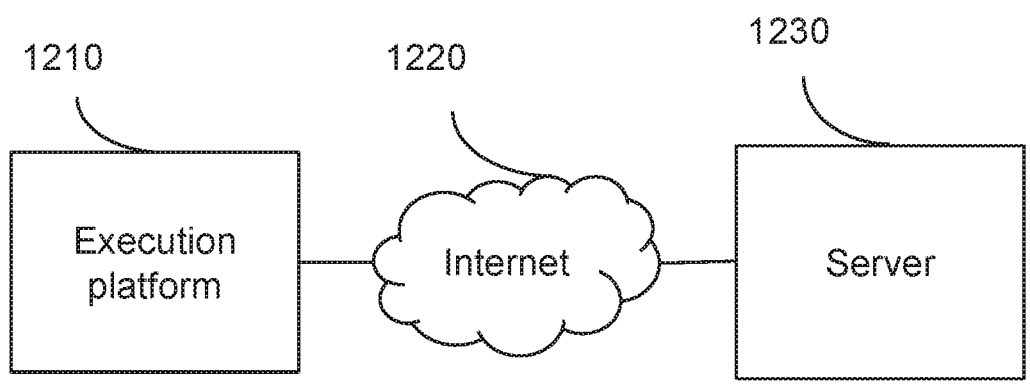
FIG. 12 illustrates a communications network comprising an execution platform and server for implementing some of the disclosed processes.

Referring to FIG. 12, a required set of specific applications 130 is provided in the application repository 1130, for example at a server 1230. The server 1230 includes one or more processing elements and may be provided in a data center (or replicated or geo-located at a number of data centers, e.g., cloud computing structure). The specific applications 130 can be served over a communication network 1220, such as a packetized data network, for example the Internet, to an execution platform 1210, such as a web browser or a native operating system environment, at a client device or a user device (e.g., smartphone, tablet, console, computer, etc.). With reference to FIG. 5, the server 1230 receives a request, for example in the form of a URL, to download the software application at step 510. At step 520, in response to the request, the server sends a bootstrap 120 or other managing framework module to the client device, e.g., a user device. The bootstrap 120 is executed in the execution platform 1210 at the client device and generates a request for a specific application or chapter 130, as described in detail below. At step 530, the request is received by the server and the requested specific application is served to the client device at step 540. The request may comprise an identification of the specific application or chapter 130 to serve, for example a setting identifier as discussed above with reference to FIG. 3, or may comprise information from which the appropriate specific application or chapter can be identified, as discussed above with reference to FIG. 4.

In implementations which download specific applications 130 at a chapter level of granularity as discussed above with reference to FIG. 1C, once an initial chapter has been requested by the bootstrap 120 and has been served and executed in the execution environment 1210, additional chapters may be requested and served, so that the process described above with reference to FIG. 5 loops back to step 530 to server the next required chapter to the client device. Some implementations of the generation of a sequence of requests for required chapters are discussed below.

Figure 5B:
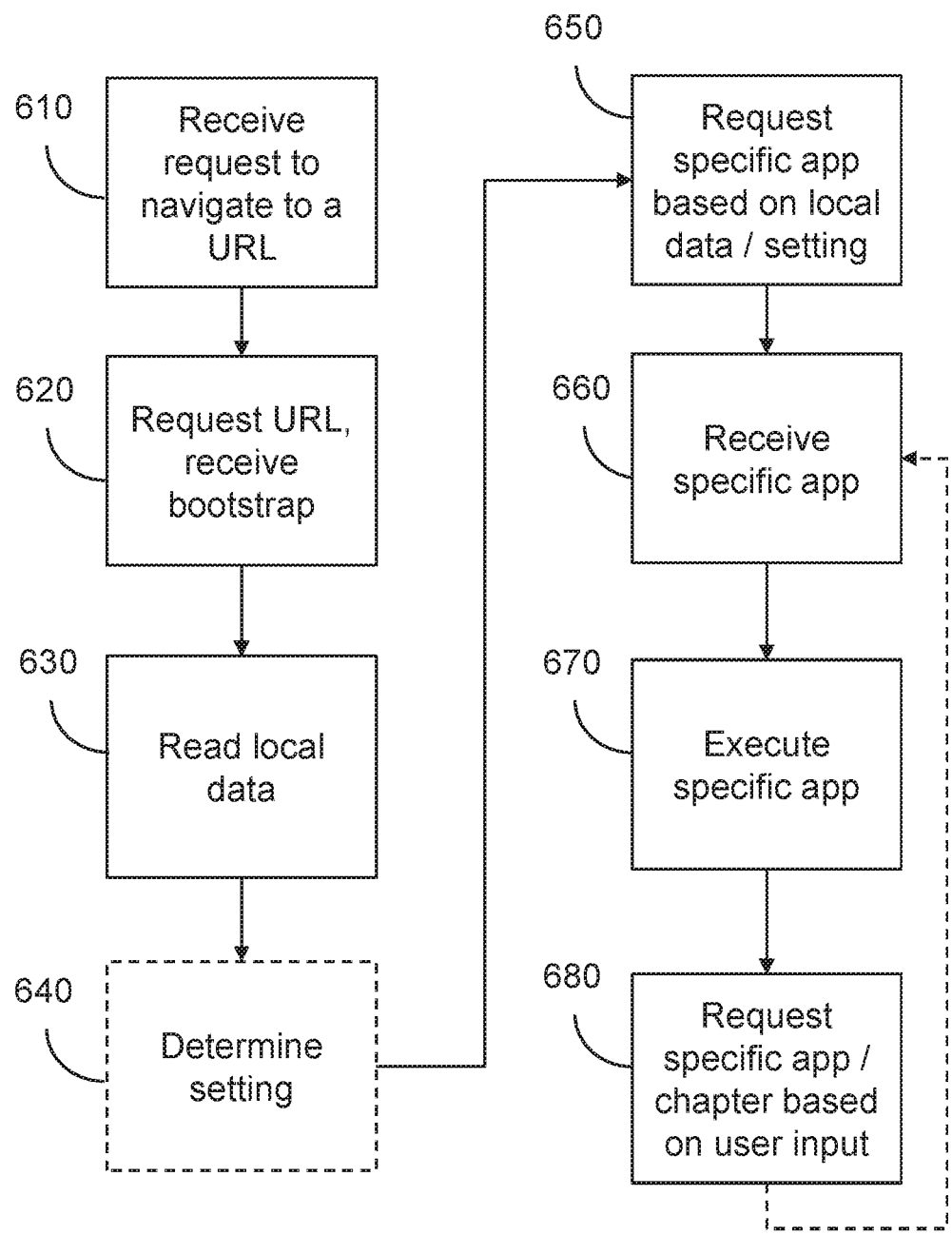
FIG. 5B illustrates processes for requesting and executing specific applications.
Figure 7:
FIG. 7 illustrates a user interface providing access to features not included in loaded specific application.

With reference to FIGS. 5B and 7, a process for loading a software application on a client device comprises a step 610 of receiving a request from a user, for example when the user enters the address in a web browser as the execution environment 1210 or clicks a link to access a URL associated with the software application. The described process makes reference to the loading of the software application in a web browser environment but it will be apparent to the skilled person how to adapt the described steps to loading specific application 130 into any other execution environment 1210. At step 620, the web browser requests the URL and receives the bootstrap 120 from the server 1230 over the communications network 1220. At step 630, the bootstrap executes and reads local information such as one or more of: device type, make and/or model; operating system type and/or version; cookies stored on the client device; a user identifier; a user token, optionally a securely authenticated token; a service provider associated with the device; a country associated with the device; the location of the device; and the like. Alternatively or additionally, any other available local information may be read.

At step 640, the bootstrap determines a feature setting for the specific application 130 to be loaded. Step 640 may comprise determining a device type and country of the device loading the software application, for example for transmission of that information to the server for selection of the required specific application by the server.

In implementations as described above with reference to FIG. 1C, where chapters 130 are loaded one by one, the bootstrap determines the chapter to load as well as the feature setting. For example, on finding no token identifying an authorized used on the client device, the bootstrap 120 may request a sign-up chapter (for example specific to a service provider associated with the client device or execution environment 1210). If a token authorizing access to the service is found on the client device and is authenticated, then a media catalogue, for example, or other start page giving access to the service provided by the software application may be requested, skipping the sign-in chapter. Again, the bootstrap may determine the information to transmit to enable selection of the specific application or chapter server side and not carry out further processing based on that information. For example, the bootstrap may determine country and device information and check for the presence of an authentication or other sign-in token and transmit that information to the server for selection of the required specific application/chapter to serve.

At step 650 the specific app or chapter 130 is requested based on the determined feature setting and/or state of the client device/the user, for example by transmitting a request that includes the information necessary to determine server-side the specific application to serve, or the outcome of any further determination, as the case may be.

It will therefore be appreciated that specific processing at step 640 (or step 640 as a whole) is optional at the client device and that, instead, the bootstrap may send the local information as part of the request at step 650, the determination of the required feature setting and/or chapter then being made server-side. In either case (specific processing or determining of information to transmit), the specific applications may be pre-prepared server-side and ready for download in response to a corresponding respective request, as described above.

The requested specific application or chapter 130 is received at step 660 and executed at step 670. In some implementations, in particular where a single specific application is loaded as in the implementations described above with reference to FIGS. 1A and 1B, step 660 may terminate the client-side loading process. In other implementations, an in particular in implementations where chapters are loaded incrementally, as described above with reference to FIG. 1C, a request for a further specific application or chapter 130 may be generated at step 680, for example based on user input and the process loops back to step 660. This loop may be executed a number of times, in particular each time a new chapter 130 is required to be loaded, although in some implementation, a chapter that has been loaded is cached at the client device so that it need not be loaded again if the user wishes to return to that chapter. In some implementations, the caching of chapters, the checking for cached chapters and/or in some instances a decision whether to reload a chapter or access the cached copy are implemented by the bootstrap 120.

In one example of step 680, once sign-up has completed successfully, the sign-up chapter may generate a call back for a media catalogue chapter, in response to which the bootstrap 120 sends a request for the media catalogue chapter to the server, which then serves the media catalogue chapter to the client device. In another example, a user is currently accessing a media player chapter with a user interface 700 as illustrated in FIG. 7, for example after having completed the sign-up chapter and selected content to be played in a catalogue chapter. The user interface 700 provides selectable on screen options for a number of features 710 that are provided by the media playback chapter itself, such a social media liking function and a function to select different cameras and viewpoints. Other options 720 provide access to functions that are provided by other chapters of the software application, for example an option to access an account management functionality. If the user selects such a feature, the current chapter 130 (media player) creates a call back to the bootstrap 120 to load the required next chapter 130 and the request is managed by the bootstrap 130 either by requesting the next chapter 130 from the server or accessing a cached copy. It can be noted that in some implementations, instead of a call-back to the bootstrap 120, a given chapter 130 may directly request the download of the next chapter 130 (optionally including a check for a cached copy in some implementations) when required.

The user interface 700, in some implementations, may provide further options 730 to access functionality not provided by any of the chapters according to the feature set determined based on the local information, for example a shopping functionality in the illustrated example in FIG. 7. The handling of a user request to action such a request for a missing feature is discussed below with reference to FIGS. 8, and 9.

In another example, systems for efficiently and securely transmitting an application to a user device, where the application is transmitted based on needed functionality or otherwise in parts, chapters, or modules are disclosed. In particular, a managing local application, e.g., a framework module or bootstrap module, is transmitted as an initial download the user device and then acts to manage remaining transmissions to the user device, with transmitted modules following the initial framework module including increased functionality that defines core features of the application.

Figure 6A:
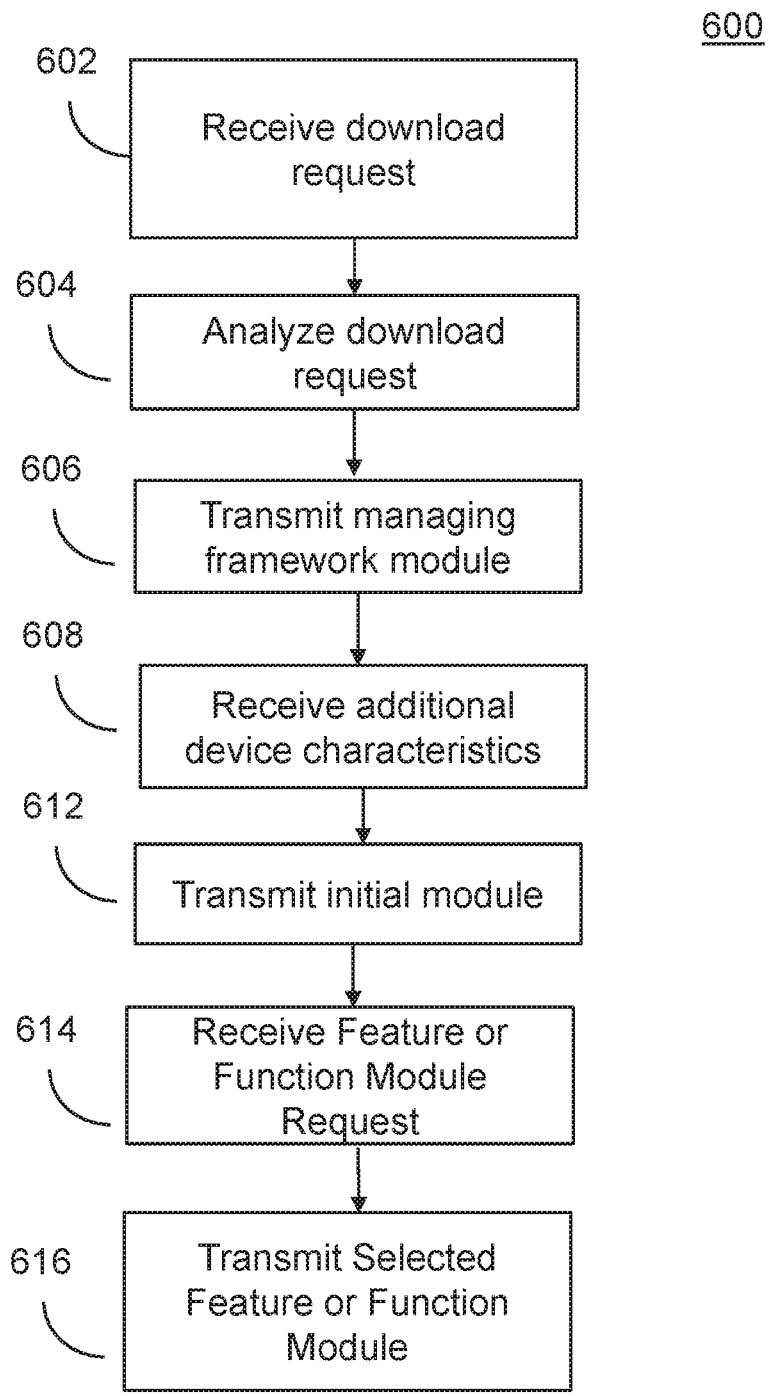
FIG. 6A illustrates a method for selective downloading of feature and/or functionality modules.

With reference to FIG. 6A, a method for selectively transmitting functionality and feature modules to a user device is disclosed. The method 600 may begin with operation 602 and a download request is received by a processing element, such as at a server or other computing hardware element. The download request may be transmitted from a user or client device, such as a smart phone, television, console, tablet, laptop, or the like, and may be through a web URL or from a device specific transmission request, e.g., "download" link on an application store or other app selection mechanism (e.g., ITUNES APP STORE, Amazon FireTV app store, GOOGLE PLAY, etc.). The download request transmitted from the user device may include request data, such as, but not limited to, device or target data, such as general category of device or operating environment in other words a target device (e.g. Fire TV, PlayStation, Android, or the like), or target operating environment, such as a web browser. The request data may be identified automatically, from a user input, or both such as due to the form of the request itself, i.e., the specific link that the user selects.

In one example, where the user is selecting the version of the application to download from an application store, such as an icon or the URL link connected to the application store input is a device specific link, e.g., PlayStation 4, iPhone, Samsung, etc. In this example, the icon on an application store or other device specific application listing may be linked to a specific URL and the request via selection of the icon is directed to the device or target specific URL pointing or mapped to the select managing framework module for the device or operating environment. In this manner, the request data may be known by a platform specific URL accessed via the device application store or may include device specific logic that identifies the device when accessed through the application store URL or other link. In another example, the user navigates in a web browser, the user may input a selection of "device" type. In other embodiments, the request data may not include any information regarding the device or operating environment of the client device. For example, when a download request is received from a web browser, the request may be agnostic and not contain information regarding the operating environment of the client device, except to identify that the request is coming from a web browser, rather than a more specific linked location, similar to the bootstrap operation disclosed in FIGS. 5A and 5B.

With continued reference to FIG. 6A, when the request is received at the server, the method 600 proceeds to operation 604 and the server analyzes the request. In particular, the server or other processing element, analyzes the request data including the target, device, or platform information to determine a select managing framework module to transmit the user device in response to the request. In some instances the managing framework module may be device or platform specific, such that managing framework module will have functionality to operate properly on the hardware constraints of the user device, e.g., can operate on a web browser, Amazon TV, Samsung TV, Android, PlayStation, or the like, where the hardware and software languages may be different from one another. The managing framework module includes logic that retrieves and loads functionality modules as needed based on the user device state or requested inputs, e.g., request for content. In this manner, the managing framework module or local manager does not include all the logic for proper/full operation of the application, but is structured to retrieve and load the functional modules as needed and requested.

After the request data or request link has been selected to determine a specific managing framework module, the method 600 proceeds to operation 606 and the server transmits the target specific managing framework module to the user device, such as through a network or the like. Because the application transmitted to the user device is not the full code required to fully operate the application, but rather only the managing module, the transmission and download to the user device may be quick and with reduced data values as compared to conventional applications downloaded onto a user device. In a specific example, the application may include a media playback feature that allows the user to view videos and other content and the managing framework application does not include the playback logic when initially transmitted to the user device, but includes functionality to allow insertion of the playback logic module when retrieved after a request.

After the managing framework module has been transmitted, the managing framework module may identify or transmit information to a server that allows the server to identification additional device and/or user characteristics, e.g., local information. For example, the device and user characteristics can include hardware information, operating system, and/or location information, these user or device characteristics can then be used to select an initial functionality module for operation. In one example, the location data may be determined by the managing framework module receiving information from the server, such as a content delivery network (CDN) server, after running on the user or client device. In particular, when the managing framework module receives the first response from the CDN server, the managing framework can analyze the response to determine where the client device is located and will understand the target device operating characteristics. More specifically, the managing framework module can determine the location of the server that received the request, e.g., with a CDN that may be hosting the application, a request routing to the server may be done based on location and/or the request may also include a location of the request. In other words, the routing of the request through the Internet or network may provide information related to the location of the request and thus a location of the user or client device. Additionally or alternatively, the user may enter in information, such as country, or the like, when requesting download or the device may use global positioning satellites or other location determining sensors to determine the location of the user device.

Once the managing framework module has determined the additional device and user characteristics, including location, the managing framework module transmits a request to the server to receive an initial or baseline module in operation. In operation 612, the initial or baseline module is transmitted to the user device. The baseline module may include device specific APIs and other interfaces that allow the more generic modules or chapters to communicate and operate on the specific target platform and locations. With respect to the device constraints, the managing framework module analyzes the operating device to determine a baseline module with APIs for the device or operating environment that can interact with functionality and feature modules that may not be device specific. As such, the analyzation used to determine the additional device characteristics is meant to compare the location data and device location to corresponding identifiers for a managing framework module. As a specific example, a U.S. based user device of a PlayStation 4 may include the U.S. location as the location data and the PlayStation 4 as the device data, which may then be matched with a managing framework module defined as a "U.S. PlayStation 4 Module." The module location and device identifiers may be stored as metadata or otherwise tagged or tied to the specific code package.

After the initial module is transmitted to the user device in operation 614 or in instances where the managing framework module includes baseline functionality after operation 606, the method 600 proceeds to operation 614. In operation 614, the server receives a feature module and/or a functionality module request from the specific managing framework module on the user device. The feature module request or chapter request includes a request for specific functionality, a feature, and/or content access. After the request is received, the method 600 proceeds to operation 616 and the server transmits the selected feature module and/or functionality module to the user device. In some embodiments, the feature modules and functionality modules may be device generic, e.g., apply to all devices supported by the platform. Thus, the transmitted feature or functionality module may be transmitted to multiple types of devices and locations of devices. This is possible due to the platform specificity of the managing framework module or the specificity of the baseline module delivered to the user device. In particular, the managing framework and/or baseline module includes the target specific APIs that will interface with the generic feature module or functionality module to allow the selected module to operate on the user device, without requiring the functionality modules to be device specific. This allows the feature chapters or modules to be coded so as to be generic and multiple iterations for various devices may not be required. Additionally, the full functionality of the application may be transmitted in piecemeal as needed, rather than in a bulk download. The various functionality and feature modules may be download each time as needed, or may be stored on the user device cache for a limited time and there may not be a need to download the modules every time they are used.

Figure 6B:
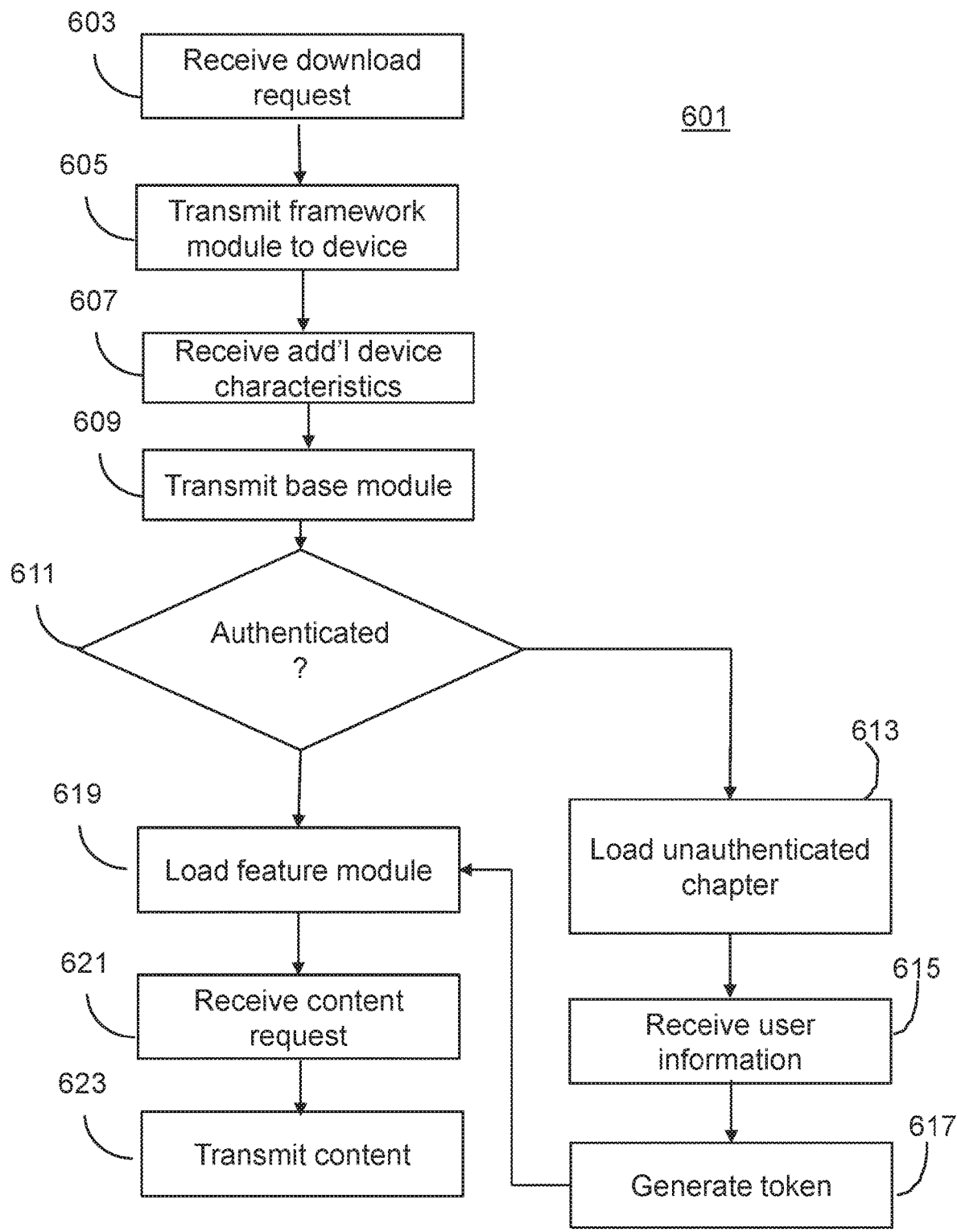
FIG. 6B illustrates a method for loading feature modules based on authentication characteristics.

Another example of utilizing a local manager module to control selective retrieval of required executable modules for a software application is shown in FIG. 6B. With reference to FIG. 6B, the method 601 may begin with operation 603 and the server receives a download request from a user device, e.g., from a user requesting a download from an application store or device/operating system specific application listing (e.g., Smart TV application download page) or from a URL request from a web browser.

The method 601 may then proceed to operation 603 and the server or other processing element that receives the user request analyses the request, such as the type of requested link, to select a target framework module or managing module to be transmitted the user device. In some embodiments the framework module is device and/or platform specific to allow the framework module to perform correctly and interface with the hardware and the operating system of the device or environment. For example, the system may include managing framework modules that are specific to web browsers, set top boxes, gaming consoles, televisions, or the like.

Once the specific framework module is determined, the method 601 proceeds to operation 605 and the server transmits the data corresponding to the framework module to the user device, such as over a network. The data includes executable logic that can be stored on the user device memory to execute the framework module.

. In many embodiments, the managing framework may identify additional device characteristics or local information, such as location, operating system, or the like, to receive a baseline chapter for functionality. With reference to FIG. 6B, in this example, the method 601 proceeds to operation 607 and the additional device characteristics, including location as identified by the managing framework module such as through a server request, are transmitted to the server. Using the device and location (e.g., country, latitude/longitude, etc.), the server identifies a particular initial or baseline module specific to the device and location characteristics. In operation 609, the baseline module is then transmitted to the user device.

The baseline module and/or managing framework alone or executing the baseline module, allow the framework module to correctly control functionality, such as operating the display, increasing volume, displaying user alerts, receiving user input, and the like. In these instances, the device characteristics identified via the download request mapping or by the managing framework module may includes device information (e.g., hardware constraints, model type, operating system, or the like), and location information of the device and/or user (e.g., as input by the user or detected automatically either from the device or via a routing process of the request itself), is used to match with a corresponding framework and/or baseline module. This allows the framework and baseline module combination to be specific to a user device and user location.

In some embodiments, the initial managing framework may include sufficient device information to operate and the method may proceed directly to operation 611. In other words, operations 607 and 609 may be omitted or optional. In other words, from the managing framework transmission, the method 601 may proceed to determining whether the user device is authenticated or not.

When the framework and baseline modules have been transmitted and installed on the user device, the method 601 may proceed to operation 611 and the framework module begins executing on the user device and determines whether the user device is authenticated. In one example, the framework module searches the onboard memory of the user device for an authentication characteristic, such as a token, key, or the security element, that indicates that the user device or the user associated with the user device has previously been authenticated by the server.

In addition to detecting an authentication characteristic, the framework module may also determine whether the authentication characteristic is valid, such as by comparing the authentication characteristic with a similar characteristic on the server, comparing an identifier of the characteristic, or the like. In other embodiments, the authentication characteristic may be selected to self-identify and/or delete after expiration and such additional validation may not be needed. The authentication characteristic confirms that the user has been authorized to view the content provided via the software application, as well as other features provided by the software application.

With reference still to FIG. 6B, if in operation 611, the framework module determines that the user device is not authenticated, e.g., an authentication characteristic is not detected or determined to be invalid, the method 601 proceeds to operation 613 and the framework module loads an unauthenticated chapter or an invalidated experience module. In one example, the framework module may retrieve the unauthenticated chapter from the server and then execute the corresponding logic. In another embodiment, the unauthenticated chapter or module may be always included with the framework module at the initial download. In one embodiment, the unauthenticated chapter is a landing "login" page displaying a message for a user to either "login" or to set up a user account. The user then has the option to input information to either login or to set up a new user account.

After operation 613, the method 601 may proceed to operation 615 and the framework module may receive user information via the unauthenticated chapter execution, e.g., as received as an input from the landing page. In one example, the user information may include a user name and/or password and/or may include user information sufficient to set up a user account (e.g., name, suggested user name, password, and optionally payment information). The unauthenticated module may then transmit the user information to the server.

Once the user information has been received, the method 601 may then proceed to operation 617 and an authentication characteristic is generated at the server and transmitted to the user device. In one embodiment, the authentication characteristic is a token or other security key that identifies the user as being able to access the additional functionality of the software application. It should be noted that the token or other characteristic may be generated onboard the user device or transmitted to the user device from the server.

With reference again to FIG. 6B, if in operation 611, the framework module determines that the user device is authenticated or after operation 617 and the authentication characteristic has been generated, the method 601 proceeds to operation 619 and the framework module retrieves a first functionality module from the server to install on the user device. In some embodiments, the first functionality module may be the base module that defines a country and device specific functionality. In some embodiments, the framework module requests the first functionality module, which may include logic for one or more features or functions of the software device, from the server. After received from the server, the first functionality module is downloaded on the user device and then executed by the framework module. In many embodiments, the first functionality module is generic to multiple devices and interfaces with an API of the framework module that converts the functionality, commands, inputs/outputs into the device specific instructions.

Once the first functionality module has been loaded onto the user device, the user then has accessibility to baseline functionality of the software application. As noted, in some instances, the framework module does not include logic sufficient to operate the baseline or required functionality of the application, but rather such functionality is transmitted piecemeal to the user device, such as after an authentication. In one example, the first functionality module may be a content catalogue that displays available content to be viewed by the user, such as videos, images, and other media. In instances where the content is videos, such as boxing matches, sporting events, and other games, where there may be location based viewing restrictions, the first functionality module may be selected by the server based on the location of the user device as determined by the framework module from the request data.

After operation 619, the method 601 may proceed to operation 621 and the server may receive a content viewing request from the user device, e.g., the user may select a particular content item from the catalogue that he or she wishes to view. In this case, the framework module determines that a second functionality module, e.g., a playback module, is required, and transmits the request to the server. The method then proceeds to operation 623 and the playback module or other second functionality module is transmitted to the user device and then the content may be streamed or otherwise sent to the user device for display.

With the method 601, specific functionality modules, such as the playback module and catalogue modules, are not loaded until the user device has been authenticated, where the loading and installation of such modules is determined by the framework module. This separation of functionality from the initial download by the user of the application from the application store or the like helps to prevent reverse engineering of the program that could provide improper access to the content playback or content catalogue. This helps to protect key content from being downloaded and improperly accessed by multiple users, as the logic corresponding to those functions is only transmitted after the user device is authenticated and in some instances is not saved on the user device, so is repeatedly retrieved and downloaded when the user wishes to view content. That said, in some embodiments, the user device may have a more aggressive local cache and some of the feature and functionality modules may be stored on the user device between uses. As one example, a content catalogue module may be stored on the device in a local cache between uses. In this example, the framework module may first check a local cache in operation 619 before retrieving the content catalogue from the server. The cache length is typically done by the web browser or device and so may vary from device to device.

Figure 8:
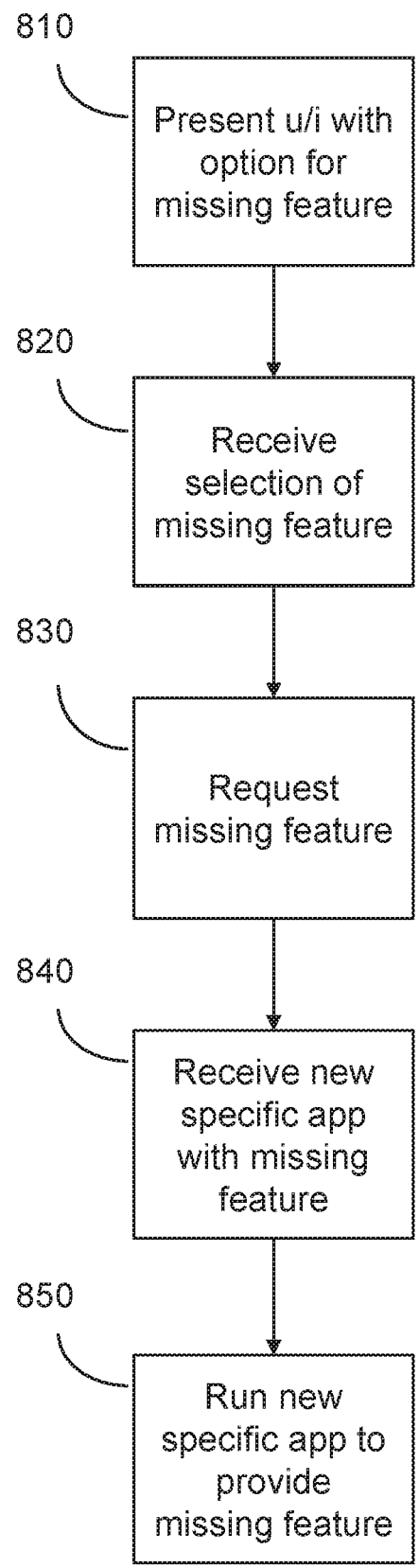
FIG. 8 illustrates a client-side process for handling a missing feature request.

In some embodiments, the software application may be configured to dynamically update with new features that can be added via new chapters or modules transmitted to the managing framework module or bootstrap. With reference to FIG. 8, a client-side process starts with a step 810 of accessing display of a user interface, such as the user interface 700, to a user with an option 730 for a feature that is missing from the current specific application 130 because it is not specified in the corresponding feature setting (and hence also not available in another chapter in the relevant implementations). At step 820, a user selection of the missing feature is received, and the missing feature is requested at step 830 from the server, either by the specific application 130 or the bootstrap 120, as described above. In some implementations, a new specific application 130 providing the missing feature is received at step 840 and executed a step 850 to provide the missing feature. In other implementations, however, the missing feature is not provided from the server in response to the request but rather is noted server-side to influence future feature settings and hence the subsequent provision of new specific applications. In such implementations, a message may be displayed in the user interface 700 informing the user that the missing feature is not currently available with the settings for the user but may become available in the future.

Figure 9:
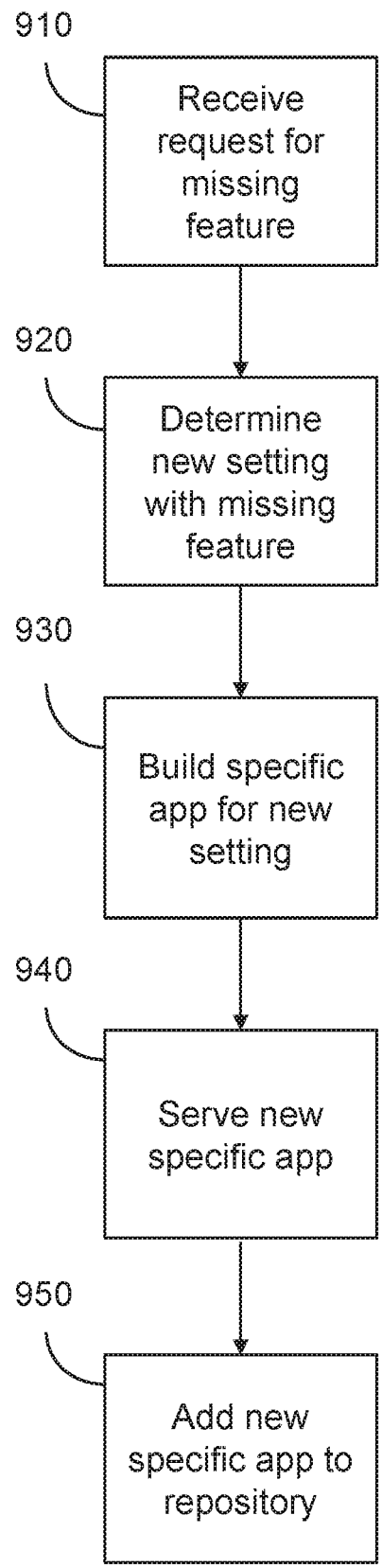
FIG. 9 illustrates a process updating a set of specific applications based on a missing feature request.

With reference to FIG. 9, a corresponding server-side process, for example at server 1230, comprises a step 910 of receiving a request for a missing feature and a step 920 of determining a new feature setting comprising the new feature. At step 930, a new specific application 130 corresponding to the new feature setting is built as described above and served at step 940 to the client device from which the request at step 910 was received. The new specific application 130 is added to the application repository 1130 at step 950, which in some implementations may include updating the table 300 by adding the new feature setting and updating the mapping 400 linking the local information (for example user identifier or profile) to the new feature setting so that the new feature remains available at the client device in the future.

Figure 10:
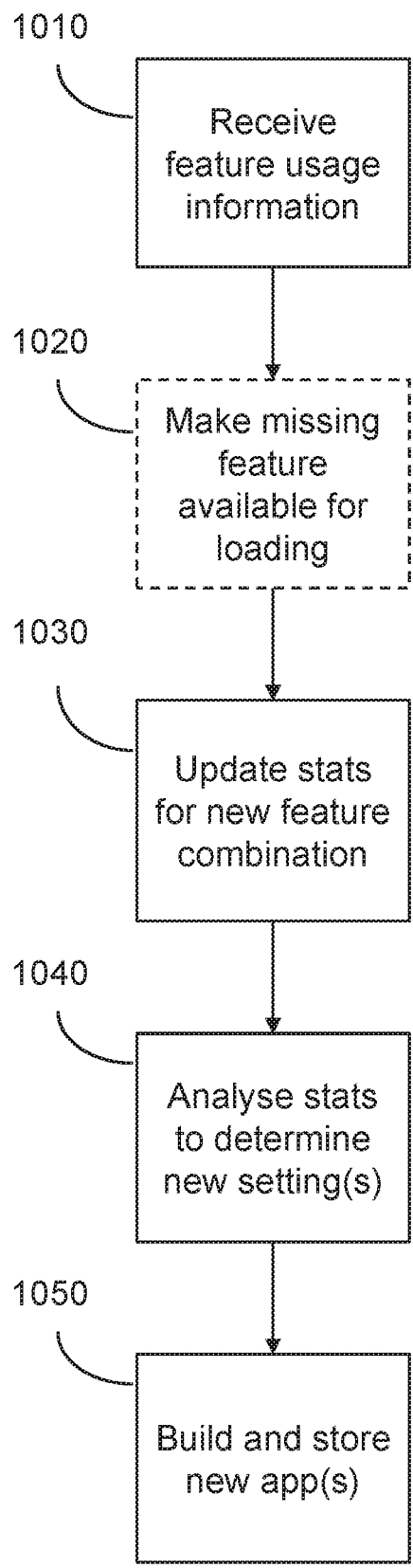
FIG. 10 illustrates a process for collecting statistics on missing features.
Figure 11:
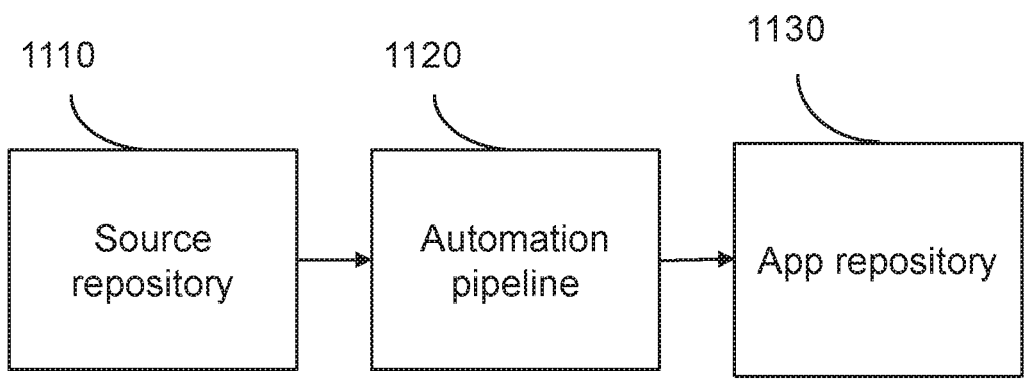
FIG. 11 illustrates a software production and maintenance system for implementing some of the disclosed processes.

With reference to FIG. 10, an alternative server-side process, which may also be used in conjunction with the process described above with reference to FIG. 9, comprises a step 1010 in which feature usage information is received. The feature usage information may comprise a missing feature request as described above, in which case the missing feature may be made available, for example as described above, at step 1020. Alternatively, in some specific optional implementations, a message that the feature is unavailable but may become available in the future may be returned at step 1020, or step 1020 may be omitted. The feature usage information may comprise, additionally or alternatively, other information from the client device, for example indicating which features of a specific application are used or not used at a specific client device or by a specific user profile. For any received feature usage information, statistics are updated for new feature combinations not currently provided in the repository 1130, for example existing feature combinations with features added, removed or changed. The updated statistics are analyzed at step 1040 to determine any (if any) new feature settings to be provided, for example comparing respective statistics and corresponding thresholds to determine if any new features or feature combinations are to be provided. If any new feature settings are determined to be required, the corresponding specific applications are built and stored in repository 1130, in some implementations also updating the table 300 and mapping 400.

Figure 13:
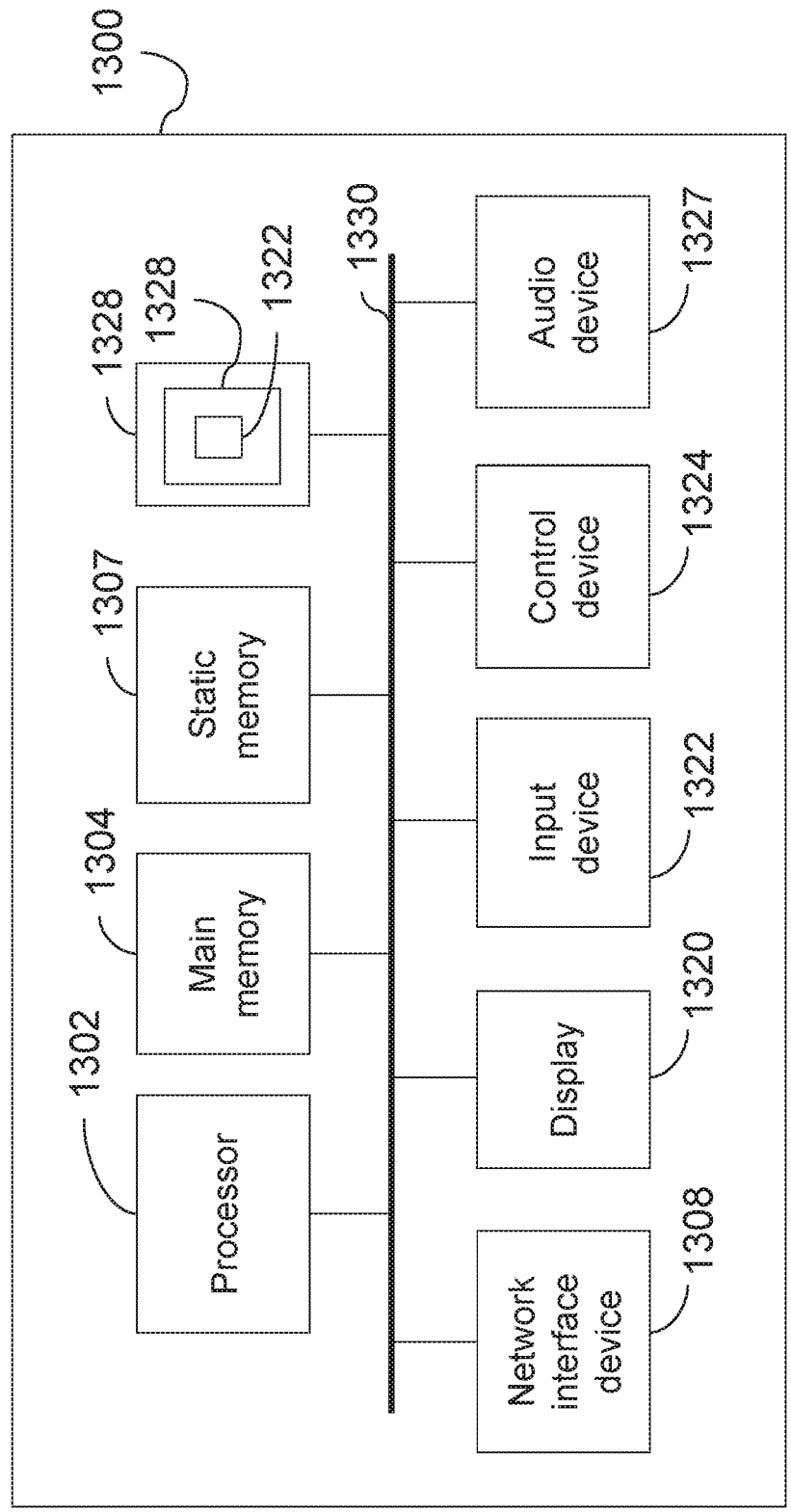
FIG. 13 illustrates a computing platform for implementing some of the disclosed processes, the software production and maintenance system, execution platform and/or server.

Reference has been made above to various computing devices and systems, for example the system implementing the source repository 1110, automation pipeline 1120 and application repository 1130, the client device implementing the execution platform 1210 and the server 1230. FIG. 13 illustrates a block diagram of one implementation of a computing device 1300 within which a set of instructions, for causing the computing device to perform any one or more of the methodologies discussed herein, may be executed, and which may implement one or more of the computing devices referenced herein. The computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random-access memory (DRAM) such as synchronous DRAM (SDRAM) or Rambus DRAM (RDRAM), etc.), a static memory 1306 (e.g., flash memory, static random-access memory (SRAM), etc.), and a secondary memory (e.g., a data storage device 1318), which communicate with each other via a bus 1330.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic (instructions 1322) for performing the operations and steps discussed herein.

The computing device 1300 may further include a network interface device 1308. The computing device 1300 also may include a video display unit 1310 (e.g., a liquid crystal display (LCD) or a cathode ray tube (CRT)), an alphanumeric input device 1312 (e.g., a keyboard or touchscreen), a cursor control device 1314 (e.g., a mouse or touchscreen), and an audio device 1316 (e.g., a speaker).

The data storage device 1318 may include one or more machine-readable storage media (or more specifically one or more non-transitory computer-readable storage media) 1328 on which is stored one or more sets of instructions 1322 embodying any one or more of the methodologies or functions described herein. The instructions 1322 may also reside, completely or at least partially, within the main memory 1304 and/or within the processing device 1302 during execution thereof by the computer system 1300, the main memory 1304 and the processing device 1302 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," "parsing", "building", "linking", "compiling", "storing", "serving", "reading", "displaying", "causing", "sending", "requesting", "providing", "executing", "running" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method of preparing a content-viewing software application for download on a user device, the method comprising:
    receiving source information comprising source code for a software application, wherein the source code comprises a source code portion for each of a plurality of features of the software application, and wherein the source code is used for building a respective application, wherein the respective application is configured to display streamed video content on the user device;
    determining a subset of features from the plurality of features based at least in part on information detected from a user request for download of the content-viewing software application from the user device;
    identifying a respective set of source code portions within the source information for each of the subset of features;
    building respective applications including the subset of features using the identified respective sets of source code portions within the source information, wherein the respective application omits features of the plurality of features that are not part of the subset of features; and
    storing the respective application for downloading of the respective application in response to the download request; and
    transmitting the respective application to the user device.

2. A method according to claim 1 wherein the plurality of features comprise one or more of: country specific adaptations; device specific adaptations; a language of a user interface provided by the content viewing software application; functionality specific to a service provider of a service provided using the content viewing software application; a payment functionality; a content viewing functionality; a content catalogue functionality; a media player; a social media functionality; a content commenting functionality and an account management functionality.

3. The method of claim 1, wherein the content viewing software application is a media consumption application comprising a video streaming functionality.

4. The method of claim 1, wherein the content viewing software application comprises chapters, each having a specific functionality, and each chapter has one or more corresponding source code portions; and wherein identifying a respective set of source code portions for each of the chapters for each of the subset of features;
    building the respective application comprises building a respective application with each of the subset of features for each of the chapters using the respective sets of source code portions; and
    storing the respective application comprises storing the respective application for each chapter for downloading of each respective application in response to a download request identifying the respective feature and chapter.

5. The method of claim 1, wherein the content viewing software application comprises a plurality of chapters, each chapter having a specific functionality and each chapter has one or more corresponding source code portions, wherein the source code for each chapter can be tested substantially independently of the source code of the other chapters and the method comprises selecting for each feature a subset of the plurality of chapters required by the feature and identifying the respective set of source code portions within the subset of chapters.

6. The method of claim 1, further comprising collecting statistics on usage of features and/or requests for missing features during use of a application by one or more users;
    generating a new feature based on the statistics and the features of the application;
    building a new application for the new feature; and
    storing the new software application for downloading in response to a download request identifying the new feature.

7. The method of claim 5, further comprising receiving a request for a missing feature from a respective application running at the user device;
    building a new software application comprising the features of the application and the missing feature, the new software application corresponding to a new feature; and
    storing the new software application for downloading in response to a download request identifying the new feature.

8. The method of claim 1, wherein identifying the respective set of source code portions within the source information for each of the plurality of features is based at least on accessing a configuration file that identifies a relevant source code portion for each of the plurality of features, by parsing the source code, or combinations thereof.

9. The method of claim 8, wherein the accessing, the parsing, or combinations thereof, is based at least on performing a keyword text search associated with each of the plurality of features, performing a search for pre-defined flags associated with the set of source code portions, or combinations thereof.

10. The method of claim 1, further comprising re-generating an existing software application based on receiving an indication of a change in source code, configuration information, features, or combinations thereof; and
   storing the re-generated software application for downloading in response to a download request.

11. A method for preparing a software application for download on a user device, the method comprising:
   accessing source information including source code for a content-viewing software application including one or more features, wherein the source code comprises a source code portion for each of the one or more features, and wherein the source code is used for building a respective application, wherein the respective application is configured to display streamed video content user device;
   determining a subset of features from the one or more features based at least in part on information detected from a user request for download of the content-viewing software application from the user device;
   identifying a set of source code portions from within the source information for each of the subset of features;
   building, based at least in part on the identified set of source code portions within the source information, the respective application including the subset of features, wherein the respective application omits features of the plurality of features that are not part of the subset of features; and
   storing the respective application for download; and
   transmitting the respective application to the user device.

12. The method of claim 11, wherein each of the one or more features comprises one or more of a location-based feature, device-based feature, user-based feature, service provider-based feature, e-commerce-based feature, viewing-based feature, organization-based feature, social-media based-feature, account-management-based feature, or combinations thereof.

13. The method of claim 11, wherein the content viewing software application is a media consumption application comprising a video streaming functionality.

14. The method of claim 11, wherein the content viewing software application includes one or more chapters, each of the one or more chapters having a specific functionality, and each having one or more corresponding source code portions.

15. The method of claim 14, wherein the one or more corresponding source code for each chapter can be tested independent from source code for the other chapters.

16. The method of claim 11, further comprising collecting statistics on usage of features, requests for missing features during use of the respective software application by one or more users, or combinations thereof;
   generating a new feature based on the collected statistics;
   building a new application for the new feature; and
   storing the new application for download in response to a download request identifying the new feature.

17. The method of claim 11, further comprising:
   receiving a request for a missing feature from a application running at the user a device;
   building a new software application comprising at least the missing feature;
   storing the new software application comprising at least the missing feature for download in response to a download request identifying the missing feature.

18. The method of claim 11, wherein identifying the set of source code portions from within the source information for each of the one or more features is based at least on accessing a configuration file that identifies a relevant source code portion for each of the one or more features, on parsing the source code, or combinations thereof.

19. The method of claim 18, wherein the accessing, the parsing, or combinations thereof, is based at least on performing a keyword text search associated with each of the one or more features, performing a search for pre-defined flags associated with the set of source code portions, or combinations thereof.

* * * * *